Oct. 8, 1963 J. M. HARTZ 3,106,602

DESIGN OF TELEPHONE TERMINAL BLOCK

Filed Aug. 7, 1961

INVENTOR.
Joseph M. Hartz
BY C. A. Gulbransen
Atty.

3,106,602
Patented Oct. 8, 1963

3,106,602

DESIGN OF TELEPHONE TERMINAL BLOCK

Joseph M. Hartz, Elmhurst, Ill., assignor to Automatic Electric Laboratories, Inc., Northlake, Ill., a corporation of Delaware Filed Aug. 7, 1961, Ser. No. 129,656
2 Claims. (Cl. 174—60)

This invention relates to terminal blocks, and more particularly, to the construction of a telephone terminal block and cover.

In the past, telephone terminal blocks have been assembled of several parts resulting in an appreciable manufacturing cost. For example; the base and cover were separate parts with a center bolt to secure the cover to the base, the electrical terminals were attached to the base by means of rivets or the like, and the cord hook post was attached to the base by a bolt.

The terminal block according to the present invention may be molded of one piece except for the electrical terminals, and these terminals may merely be pushed into recesses in the block with no separate attachment to the block. Having the cover molded integrally with the base obviates the need of a separate hinge. A special snap-catch for the cover may secure the cover to the base without a center bolt. In addition, this invention provides a terminal block in which the electrical terminals are spaced apart such that they no longer require ribs or barriers to guard against electrical short between them. Moreover, maintenance of the terminal block shown herein is easily accomplished since the cover cannot be put on incorrectly so as to cut the telephone cord, nor can the cover be mislaid.

Therefore, it is a primary object of this invention to provide a simple and economical telephone terminal block.

A feature of this invention is a telephone terminal block designed such that it becomes possible to make the block and cover in one piece, preferably of molded plastic material.

It is a further feature to provide a telephone terminal block having electrical terminals which need no separate attachment to the block, but merely fasten permanently to the block when pushed into recesses therein.

It is a further feature to provide a telephone terminal block having a cover which cannot be opened inadvertently.

Briefly, the embodiment of the invention described herein comprises a telephone terminal block and cover molded of one piece plastic material. A connecting web, also integrally molded, forms a hinge between the block and cover. The electrical terminals themselves are U-shaped, and their legs lodge into recesses in the block to hold the terminal securely without additional attachment. The cover and its latch are designed such that pulling on the terminal wires merely causes the latch to engage more securely.

The invention will be more fully understood from the following detailed description of an embodiment thereof. In the accompanying drawings.

Figure 1:
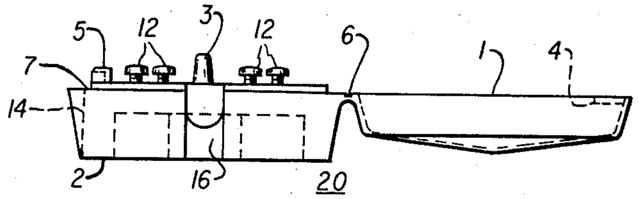
FIG. 1 is an edge view of the block and cover showing the integrally molded hinge, and the cord hook post.
Figure 2:
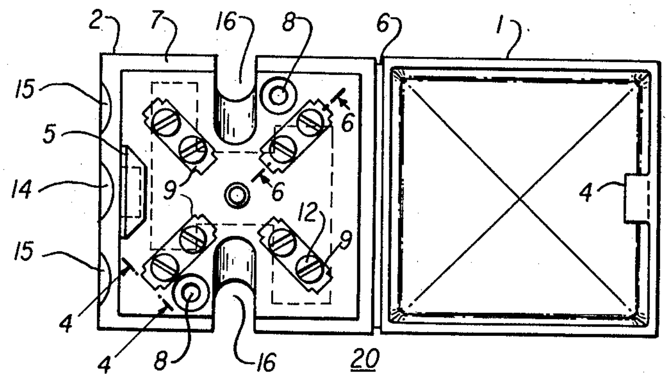
FIG. 2 is a top view of the block showing the electrical terminals arranged in spoke-like fashion about the cord hook post. The catch and the tab which engages with it are also shown.

Referring now to the drawings, in FIGS. 1 and 2, the base 2 and cover 1 of the terminal block 20 are shown as being of one piece molded plastic material, preferably of polypropylene plastic. I have found that a terminal block when molded of plastic material such as polypropylene not only has the insulating properties required for electrically insulating the terminals against each other and the mechanical strength necessary for a device of this type, but also has sufficient flexibility and durability to facilitate molding the cover to the base by means of an integrally molded thin connecting web. As shown in the drawing, the base 2 has an integral cord hook post 3, and an integral catch 5. The cover 1 has an integral tab 4 which engages catch 5. The terminal block 20 can be mounted by means of screws or bolts through mounting holes 8 in base 2. Opposite sides of base 2 are tapered such that the mounting surface has a smaller cross-sectional area than the upper surface. It is noted that the molding is relatively thin at the junction 6 between cover 1 and base 2. This thin cross-section, or web, is flexible and serves as a hinge. To prevent undue stress on hinge 6 when cover 1 is in its closed position, a channel 7 is formed around the edge of the base 2 in which the lower edge of cover 1 fits.

Figure 4:
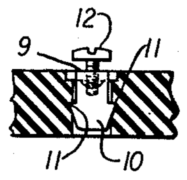
FIG. 4 is an enlarged cross-section taken along line 4—4 of FIG. 2, of an end view of an electrical terminal showing the ears which prevent the terminal from being removed.
Figure 5:
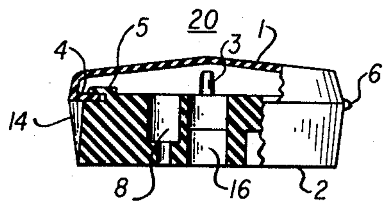
FIG. 5 is an edge view of the block, partly in cross-section, with the cover closed, showing the tab engaging the catch. The cord hook post is shown as terminating a short distance below the cover.
Figure 6:
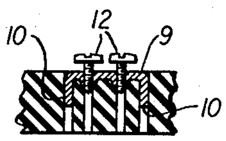
FIG. 6 is an enlarged cross-section taken along line 6—6 of FIG. 2, showing the side view of an electrical terminal as being substantially U-shaped.

Electrical terminals 9 are placed in spaced recesses about cord hook post 3 in a spoke like design. In FIGS. 4 and 5, terminals 9 are seen to be generally U-shaped, with each leg 10 of the U having a pair of ears 11 which protrude into and frictionally engage the sides of the recesses. In this manner, terminals 9 are secured to the base 2 without a separate rivet or bolt. Screws 12 of terminals 9 serve as a fastening means for spade connectors on the ends of the wires in cord 13.

Cover 1 is held in its closed position by means of the interaction of tab 4 and catch 5. As shown in FIG. 5, tab 4 and the edge of cover 1 together form a hook, the tongue of which is tab 4. Tab 4 extends toward hinge 6 and catch 5 extends in the opposite direction. When cover 1 is brought into its closed position, tab 4 overlaps catch 5 and then snaps into catch 5. Cover 1 may be opened only by simultaneous depression of the center of cover 1 until it nears the top of post 3, and lifting the outer edge of cover 5 which is accessible by channel 14. It is noted that depression of the center of cover 1 moves the edge of the cover outward on which tab 4 is located, thus pulling tab 4 out of catch 5. By lifting on the outer edge of cover 5, the cover may then be opened. Downward movement of the center of cover 1 is limited by center post 3 which serves as a stop to prevent damage to the cover.

Figure 3:
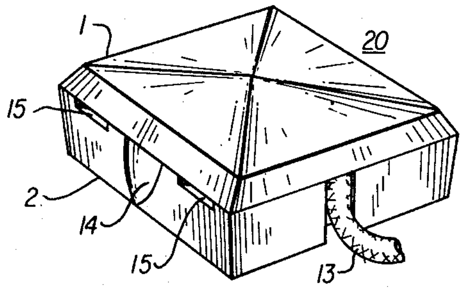
FIG. 3 is a perspective view of the block showing the cord emerging from the block as it would appear when attached to the terminals and the cord hook post.

As previously noted, tab 4 and cover 1 together form a hook with tab 4 as the tongue. In FIGS. 2, 3, and 5 it is seen that if cord 13, which extends from base 2 through recess 16, is by inadvertence displaced upwardly cover 1 will be lifted slightly at that point. It is observed that this lifting will cause the edge of the cover on which tab 4 is located to move inwardly, pulling tab 4 further into catch 5 as the tongue of a hook. Therefore, the cover cannot be opened by pulling on the cord, nor can it be opened by depressing the center of the cover alone—as when it might be when bumped by furniture or the like. The cover thus may be opened only by simultaneous depression of the center of the cover, and lifting of the outer edge of the cover. Cut-outs 15 are provided in base 2 so that a flat instrument may be inserted and turned slightly to bear upward on the outer edge of the cover if it is desired to assist in lifting the outer edge of the cover when the center of the cover is depressed.

While the invention has been described with reference to a particular environment, other applications will be readily apparent to those skilled in the art. The invention, therefore, should not be limited to the particular arrangement shown and described but should cover all modifications, within the spirit and scope of the claims.

What is claimed is:

1. A terminal block comprising a base member of insulating material and a lid member integrally molded therewith and joined to the base by a thin web of said material forming a hinge by means of which the lid may be folded over said base, a center post on the upper side of the base also integrally molded therewith and extending upward for a certain distance, a series of terminals each extending from said center post and having downward projections extending into openings in said base and frictionally held therein, a tab member on the inside of the cover opposite said hinge, a slotted opening in the side of said base opposite said hinge, said tab member entering said slotted opening when the cover is closed by folding it over the base, the top of said cover being dome shaped and flexible and with the center part thereof lying a certain distance above the top of said center post when the cover is closed with the upward tension thereof tending to hold the tab in said opening, the dome shaped center part of said cover, when pushed downward into engagement with the top of said post, causing the edges of the cover to spread to thereby move said tab outward in said opening so that it can be readily removed therefrom to open the cover, said post limiting the downward movement of the center part of the cover to prevent damage thereto and a pair of channels one on each side of said base, adjacent said hinge, by means of which wires may enter the block and be wrapped about said center post and attached to said terminals.

2. A terminal block as claimed in claim 1 in which the base is a square member and in which each of said terminals extends diagonally from the center post to a corner of the base.

References Cited in the file of this patent

UNITED STATES PATENTS

| | | |
|---|---|---|
| 2,199,219 | Edwards et al. | Apr. 30, 1940 |
| 2,333,266 | Miller | Nov. 2, 1943 |
| 2,958,439 | Yochem | Nov. 1, 1960 |
| 3,012,219 | Levin et al. | Dec. 5, 1961 |

FOREIGN PATENTS

| | | |
|---|---|---|
| 816,918 | Great Britain | July 22, 1959 |